United States Patent Office 2,735,811
Patented Feb. 21, 1956

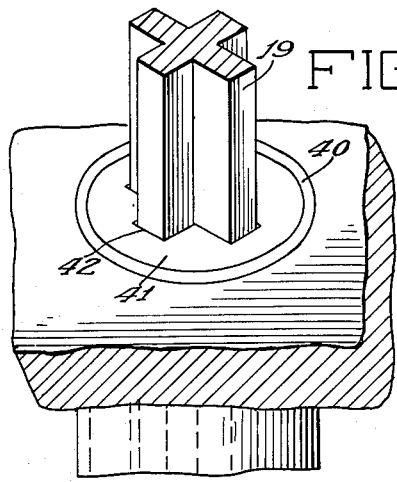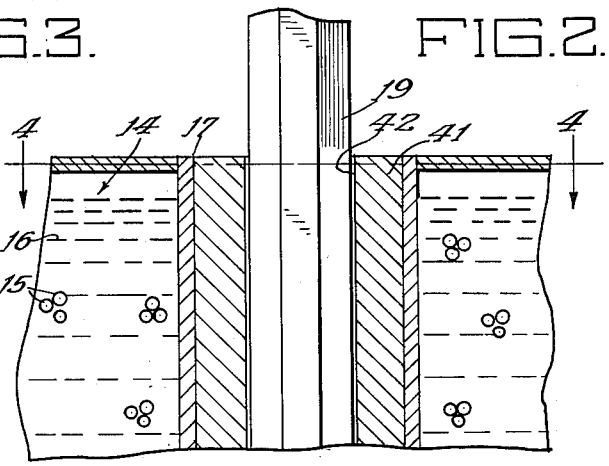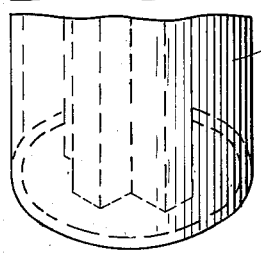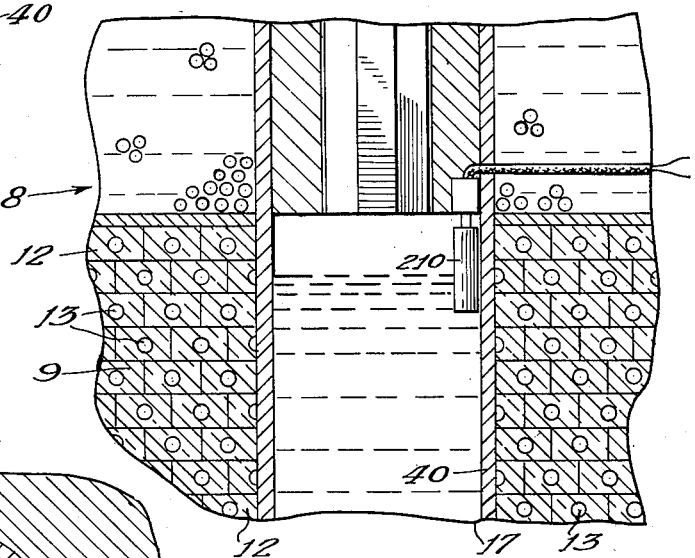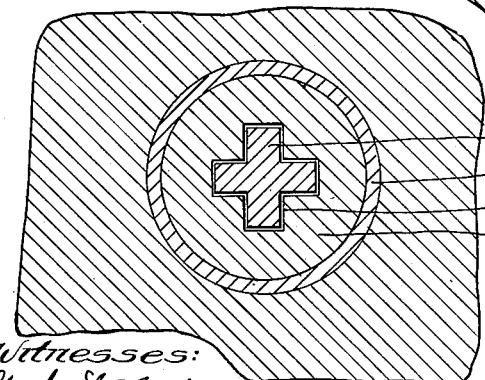

2,735,811

REACTOR CONTROL

Alvin M. Weinberg, Oak Ridge, Tenn., Gale J. Young, Chicago, Ill., Philip Morrison, Pittsburgh, Pa., and Leo A. Ohlinger, Chicago, Ill., assignors to the United States of America as represented by the United States Atomic Energy Commission Application December 13, 1945, Serial No. 634,858

1 Claim. (Cl. 204—193)

This invention relates to neutronic reactors and more particularly to means and methods for controlling a neutronic reaction involving nuclear fission of uranium or similar material.

It is known that the isotope $U^{235}$ in natural uranium can be fissioned by bombardment with thermal neutrons, i. e. neutrons at or near thermal equilibrium with the surrounding medium. In a device known as a neutronic reactor, it is possible to provide a self-sustaining chain reacting system operating at high neutron densities in which the fission neutrons produced give rise to new fission neutrons in sufficiently large numbers to overcome the neutron losses in the system. This is possible because one result of fission is the production of approximately two fast neutrons on the average for each fission. It is therefore practicable to build a successful chain reacting system that is useful as a source of neutrons for producing radioactive isotopes of elements, and has many other uses. However, most of the neutrons produced by the fission process are set free with a very high energy of above one million electron volts average and must be slowed to thermal energies before they are most effective to produce fresh fission by reaction with $U^{235}$ atoms. A chain-reacting system to be successful must be designed in such a way that neutrons are slowed down without much absorption until they reach thermal energies and then mostly enter into uranium rather than into any other element. Carbon in the form of graphite is an excellent slowing medium or moderator, in that it has a small neutron capture probability and therefore will absorb few neutrons; it is a light element so neutrons are slowed by colliding with it; and it is cheap, available and easily worked. Other moderators such as deuterium and beryllium may also be used, but the present invention will be described in connection with a carbon moderated neutronic reactor having one particular geometry, that is, one particular arrangement of fissionable material bodies in the moderator, although it is equally useful in other types of neutronic reactors. It will be understood that the basic criteria for operativeness of a neutronic chain reaction, such as moderator and fissionable materials, sizes, spacings, etc., constitute in themselves no part of the present invention, being disclosed in the copending application of Fermi and Szilard, Serial No. 568,904, filed December 19, 1944, now Patent No. 2,708,656, among others.

An initial number of fast neutrons, in the system by going through the process of absorption and fission, produce in the next generation a number of fast neutrons generally different from the initial number. The ratio of the number produced after one generation to the initial number for a system of infinite size is called the reproduction or multiplication factor of the system and is denoted by the symbol K. If K can be made sufficiently greater than unity to create a net gain in neutrons and the system made sufficiently large so that this gain is not entirely lost by leakage from the exterior of the system, then the system will be self-sustaining. The neutron reproduction ratio $r$ in a system of finite size differs from K by the leakage factor, and must be sufficiently greater than unity to permit the neutron density to rise exponentially. Such a rise will continue indefinitely, if not controlled.

During the interchange of neutrons in a finite system comprising bodies of uranium in a moderator, neutrons may be lost in four ways; by absorption in the uranium metal or compound without producing fission, by absorption in the moderator, by absorption in impurities present in the system, and by leakage from the system. In a properly designed neutronic reactor, these losses must be controlled and correlated so that the reproduction ratio $r$ may be made greater than unity to initiate the reaction. The neutron density is allowed to build up exponentially in the reactor until the desired neutron density is attained. At this time certain neutron absorbers or "impurities" may be introduced into the reactor in sufficient quantities to reduce $r$ to unity so that the neutron density will remain constant. This type of control, used to maintain $r$ at or near unity, is hereinafter designated "normal" control and is usually achieved by the use of a rigid member designated a "control rod." Furthermore, if the neutron density should approach a danger point, or if the system should otherwise fail to function properly, provision must be made for certain emergency controls hereinafter called "safety controls" that will introduce the proper neutron absorbers into the reactor to stop the chain reaction.

Hence, an object of the present invention is to provide a novel method and means for quickly inserting neutron absorbing material into a neutronic reactor to stop the chain reaction.

The effect of impurities on the optimum reproduction factor $r$ may be conveniently evaluated by means of certain constants known as "danger coefficients" that are assigned to the various elements. These danger coefficients for the impurities are each multiplied by the per cent by weight of the corresponding impurity, and the total sum of these products gives a value known as the total danger sum. This total danger sum is subtracted from the reproduction factor $r$ as calculated for pure materials and for the specific geometry of the neutronic reactor under consideration.

The danger coefficients are defined in terms of the ratio of the weight of impurity per unit mass of uranium and are based on the cross section for absorption of thermal neutrons of the various elements. These values may be obtained from physics literature on the subject, such as Physikalische Zeitschrift, vol. 43, p. 440 (1942) and Zeitschrift für Physik, vol. 121, p. 201 (1943), and the danger coefficient computed by the formula $$\frac{\sigma_i . A_u}{\sigma_u . A_i}$$

wherein $s_i$ represents the cross section for the impurity and $s_u$ the cross section for the uranium, $A_i$ the atomic weight of the impurity and $A_u$ the atomic weight for uranium. If the impurities are in the controls they are computed as their per cent of the weight of the uranium of the system.

Danger coefficients for some elements are given in the following table, wherein the elements are listed according to their chemical symbols:

| Element: | Danger coefficient |
|---|---|
| B | 2200. |
| N | 2.4 |
| O | 0.004 |
| Al | 0.23 |
| Fe | 1.2 |
| Ni | 3.2 |
| Cd | 760.0 |

In neutronic reactors having a high reproduction ratio the neutron density will increase to a high value in a short time interval. For instance, if $r$ is exactly 1.01, the neutron density would be tripled every second. If $r$ were 1.02 or 1.03, the factor by which the neutron density would be multiplied each second would be 1100 and 780,000 respectively. It is apparent that any safety control device for inserting neutron absorbers into the reactor must work very quickly to prevent the neutron density from rising to such a high level such that the neutronic reactor could be destroyed.

The heretofore provided safety rods may fail to move into the openings in the reactor. The present invention contemplates rapidly forcing into the aforesaid openings a fluid neutron absorber, either alone, or with the safety rods.

Hence, another object of the present invention is to provide a novel method and means for controlling a neutronic reactor in which a solid and a fluid absorber are forced into the same opening in a reactor so that maximum safety control is achieved.

After the reaction has been stopped, and especially when stopped by insertion of emergency neutron absorbing means in response to abnormally high neutron density indications, it is necessary to remove the neutron absorbers from the reactor for resumption of normal operation. It is therefore desirable to provide a control means insertable within the reactor that may be removed without damage to the reactor such as retention of residual amounts of the absorber within the reactor. Consequently, it is a further object of the present invention to provide a novel neutron absorbing medium that may be removed and residual portions thereof dissipated from the reactor when it is desired to resume normal operation of the neutronic reactor.

In accordance with the present invention, there are provided safety control means and methods for controlling or stopping a neutronic reaction by introducing within the reactor a neutron absorbing medium of such a form and type that the reaction is immediately terminated while at the same time providing for positive removal of all of the absorbing medium for reinitiation of the neutronic reaction. More particularly, there is provided a neutron absorbing medium having flowable qualities such as a neutron absorbing solution or fluid that may be vaporized or removed without leaving highly neutron absorbent residues within the reactor.

Other objects, features and advantages of the present invention will become apparent from the following description read in connection with the drawings, in which:

Fig. 2 is an enlarged side elevational view partially in cross section of a portion of a neutronic reactor including a control rod and a portion of the surrounding structure;

Fig. 3 is a perspective view partially in cross section showing certain details of that portion of the neutronic reactor shown in Fig. 2; and Fig. 4 is a cross sectional view taken on line 4—4 of Fig. 2.

Figure 1:
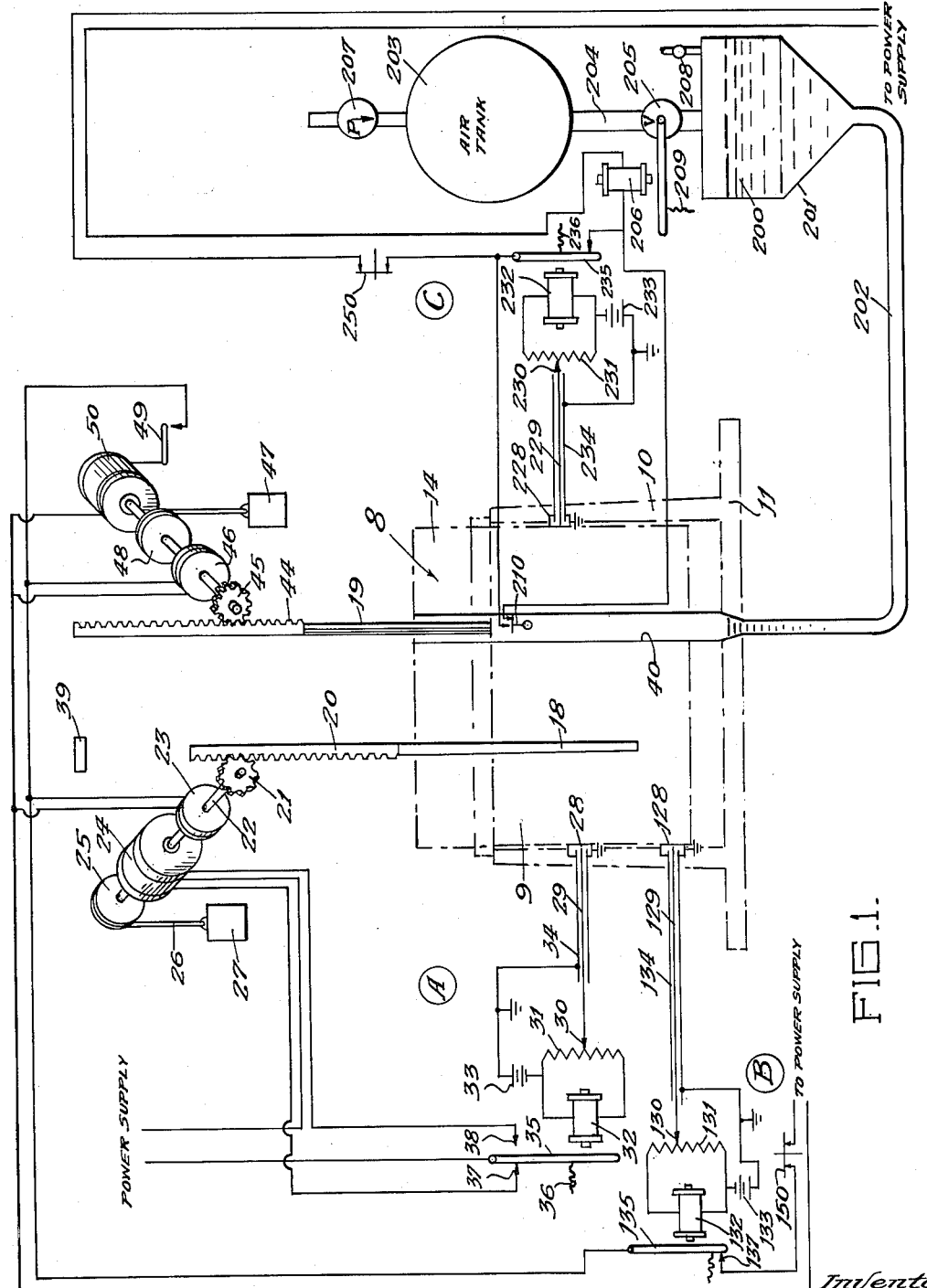
Fig. 1 is a schematic view of a neutronic reactor equipped with an embodiment of the present novel improved control means.

Although the present invention is useful in many types of neutronic reactors, it is preferred to illustrate it in conjunction with a self-sustaining chain reacting system in which the active structure 9, is made up of high quality graphite with natural uranium metal embedded in said graphite.

Referring to Fig. 1 in which the neutronic reactor, generally designated 8, is shown in outline, and to Fig. 2, in which a portion of the active structure 9 is shown, side walls 10 are erected on a heavy foundation 11, both preferably of poured concrete about five feet thick, forming a large concrete tank. In this tank the active structure 9 of the reactor is erected of graphite blocks. Each graphite block in said active structure 9 is provided with one or more recesses in which is placed a uranium slug 13. The graphite blocks are of such a size, and the openings in them are so placed that the reactor will have the proper geometry to provide the best utilization of the neutrons in the chain reaction. Mounted above the active structure 9 is a biological shield 14 that is composed of lead shot 15 and water 16. Such a shield is necessary to protect personnel from gamma rays and other radiations emanating from the reactor, that are harmful to humans.

Extending through the shield 14 and the active structure 9 are a plurality of vertical openings 17 through which control rod 18 and safety rods 19 may enter the reactor. One control rod 18 in the center of the active structure 9 is shown and one is usually sufficient for normal control of the reaction. One safety rod 19 is shown, but it will be understood that this represents a plurality of such safety rods arranged in a geometrical pattern covering the center of the active structure. For instance, in one large installation as many as twenty-nine safety rods are provided.

The control rod 18 is made of a thin layer of cadmium sandwiched between thin layers of aluminum to provide mechanical strength. As indicated above cadmium has a relatively high danger coefficient and a small amount introduced into the reactor will reduce the $r$ of said reactor considerably. The control rod 18 is rigidly secured to a rack 20 by which it is inserted and withdrawn from the reactor. Co-acting with said rack 20 is a pinion 21 mounted on a shaft 22 that is driven through a magnetically operated clutch 23 by a reversible motor 24. A sheave 25 secured to shaft 22 has wound upon it a cable 26 supporting a counterweight 27 which balances the weight of the control rod 20 so that motor 24 need only provide enough power to overcome the friction of the control rod system. Circuit A controls the movement of reversible motor 24 while circuit B controls magnetically operated clutch 23. These circuits are further described hereinafter.

Two separate safety control systems are provided for stopping the chain reaction, should the neutron density rise above a safe point. As has been explained, a plurality of rigid safety rods 19 are spaced around the center of the pile and these are operated by circuit "B." Furthermore, in accordance with the present invention, a second safety control system operated by circuit "C" very quickly forces neutron absorbers in a flowable form into the reactor in case of an abnormal condition in said reactor.

The safety rods 19 are suspended above the center of the neutronic reactor. Each safety rod is cross-shaped and made of steel containing boron; for example, one satisfactory rod contains about 3 percent boron. The safety rods 19 are long enough to extend through the full length of the active portion of the reactor and may be of any suitable width. Knowing the weight of the rods, their composition, the danger coefficients of the elements in said composition, and the positions that the rods will assume in the reactor, it is a simple matter to decide the number of safety rods necessary for any desired reduction of $r$ in accordance with the formula $$\frac{\sigma_i}{\sigma_u}\cdot\frac{A_u}{A_i}$$

as herebefore explained.

The thin-section cross-shaped safety rod is found to be more effective than a round or a flat rod, because of the larger surface to volume ratio of the cross-shaped rod. About 10 per cent increase in effectiveness is gained by the cross-shaped rod over a flat rod of the same width and the same volume. The safety rods 19 are used only in an emergency when it is essential that the chain reaction be halted as quickly as possible. Therefore, a rod of maximum effectiveness such as the cross-shaped boron steel rod is used. On the other hand cadmium is preferred for a normal control rod, because it does not absorb neutrons quite as readily as the boron steel and therefore the cadmium rod travels further into the reactor to provide a given reduction in $r$ than would the boron steel rod for the same reduction. Since a slight movement of the cadmium rod does not have as great an effect as would a similar movement of the boron steel rod, the control is not as delicate and therefore the mechanism for moving the rod 18 may be simpler.

Each safety rod 19 is suspended above an aluminum tube 40 that extends from the top of the biological shield 14 to the concrete floor 11 of the reactor 8. Tube 40 is considerably larger than the safety rod 19; a four-inch diameter aluminum tube used with a two and one half inch width safety rod has proven satisfactory. Inside of each tube 40 and extending the depth of the shield 14 is a steel sleeve 41 provided with a slot 42 machined to fit the safety rod 19. Sleeve 41 acts as a guide bearing for the rod 19, and together with rod 19 substantially fills the tube 40 to absorb most of the radiation which otherwise would escape up the tube 40 and thereby pass through the biological shield 14.

The operating mechanism for each safety rod includes a rack 44, engaged by a pinion 45 driven by a motor 50, through a magnetic clutch 46. A counter-weight 47 suspended from a sheave 48 balances the weight of the rod 19. Circuit B controls the operation of motor 50 and magnetic clutch 46.

In addition to the safety rods 19, another means is provided in accordance with the present invention for stopping the chain reaction. As will hereinafter be seen, the speed with which the safety rods 19 enter the reactor is limited by the acceleration due to gravity. In the improved safety means, neutron absorbers capable of flowing are forced rapidly into the reactor by air pressure, or other suitable means. The flowable absorbers may be a gas, comminuted solids suspended in a fluid or a liquid composed of elements having a total danger coefficient sum to reduce $r$ the desired amount. Sufficient water forced into the pile would stop the reaction, but the amount that can enter the pile is limited by the available space in tubes 40. However, by adding to water an impurity such as a volatile compound containing nitrogen, the total of the danger coefficients of the elements in the mixture may be made high enough so that the reproduction ratio $r$ of the pile is reduced considerably below unity, when tubes 40 are filled with said mixture.

While many liquids such as a solution of boric acid could be used to stop the chain reaction, it is preferred to use a volatile liquid that can easily be removed from the reactor 8. If boric acid were used, a sufficient residual amount of it might cling to the inside of the aluminum tube to seriously reduce the reproduction ratio of the reactor even after the major portion of the boric acid solution was drained off. Since boron has a danger coefficient of approximately 2200, even minute amounts of it could seriously reduce the reproduction ratio of a reactor.

It is preferred to dissolve an ammonium compound such as ammonium nitrate ($NH_4NO_3$), ammonium nitrite ($NH_4NO_2$), ammonium chloride ($NH_4Cl$) or ammonia ($NH_3$) in water and use this mixture in the neutronic reactor. All the above compounds decompose to form gaseous products at relatively low temperatures and, therefore, any slight amount left in the reactor after draining would be driven off as a gas when the reactor is heated in normal operation.

The addition of 0.64 gram of $NH_4NO_3$, 0.52 gram of $NH_4NO_2$, 0.065 gram of $NH_4Cl$ or 0.074 to each cc. of water has been found to approximately double the efficiency of the mixture in stopping a chain reaction as compared to water alone. The preferred mixture is 0.52 gram of the nitrite ($NH_4NO_2$) per cc. of water since said nitrite decomposes at a low temperature and is thus easily eliminated from the reactor.

Referring now to Fig. 1 means are shown for automatically introducing a neutron absorbing liquid 200 into the neutronic reactor 8. The liquid 200 is stored in a closed tank 201, connected by a system of pipes 202 to the lower ends of tubes 40. These connecting pipes 202 are of large size so that the liquid may be quickly forced into the reactor 8. Tank 201 and pipes 202 are placed at such a level that the top of liquid in the tubes 40 is just below the active structure 9 of the reactor 8. A compressed air tank 203 is connected to liquid tank 201 by a pipe 204 in which is placed a valve 205 held closed by solenoid 206 so that the compressed air cannot enter liquid tank 201 until the solenoid 206 is de-energized allowing spring 209 to open valve 205. An automatically operated pump 207 keeps the air in tank 203 at the desired pressure.

Solenoid 206 is controlled by circuit "C" which is further described hereinafter. When solenoid 206 is deenergized allowing spring 209 to open valve 205, compressed air from tank 203 enters tank 201 forcing liquid 200 into the tubes 40. The liquid 200 then flows up tubes 40 until it reaches the float of a float-operated switch 210 closing said switch thereby connecting the power supply to solenoid 206 which in turn closes valve 205 shutting off the air from tank 201. After the chain-reaction has stopped vent valve 208 may be opened allowing the liquid to drain from tubes 40 back into tank 201.

The neutronic reactor above described is adapted for automatic normal control to maintain the neutron density within the reactor substantially constant, and thus provide a substantially constant power output. Due to the fact that large masses of materials are utilized in the reacting portion of the structure, there is a temperature lag therein. Consequently, it is convenient to monitor and control the structure by means of ionization chambers, or equivalent devices which will measure the neutron density at the periphery of the active structure 9 of the reactor. As the rate of neutron diffusion out of a chain reacting system is always proportional to the rate of generation of neutrons within the structure, the ionization chambers can readily be placed at the periphery of the active structure 9 and in fact are preferably so positioned in order that they be not subjected to the extremely high neutron densities existing within the reactor.

Before proceeding to a description of one type of control system that may be utilized in controlling the reactor described herein, it is desirable to point out the manner in which the control rods operate to regulate the neutron density. As has been heretofore pointed out, in any finite self-sustaining chain reacting structure, the attainable neutron reproduction ratio $r$ of the system must be greater than unity. For any value over unity, the chain reaction becomes self-sustaining and the neutron density, without control, would increase exponentially in point of time with possible destruction of the device. For proper control, the system must be held substantially balanced by maintaining the chain reaction at some point where the number of new or secondary neutrons produced is approximately equal to the number of primary neutrons initiating the chain. Under these conditions, the reacting portion of the structure will continue to maintain the neutron density therein which obtained when the system was balanced.

However, in order to enable attainment of a desired neutron density, the neutron density must be permitted, for a period of time, to rise until the desired density is reached. After the desired density has been reached, it is only necessary thereafter to hold the neutron density substantially constant.

As is explained above, the reproduction ratio $r$ of any neutronic reactor is reduced by the presence of impurities which absorb neutrons, and such impurities can be introduced in the reactor in the form of control rod 18 made of cadmium which will absorb a large number of neutrons. The depth to which this control rod penetrates into the reactor will determine the amount of neutron absorption and therefore the reproduction ratio of said reactor. A range can be obtained between a condition providing a neutron reproduction ratio which is greater than unity and a condition less than unity at which no self-sustaining chain reaction can be maintained. The exponential rise in neutron density can be made relatively fast or relatively slow, in accordance with the control rod position, that is whether the reproduction ratio is permitted to be much greater than unity, or only slightly greater than unity. Because there is a small percentage of delayed neutrons emitted in the fission process the neutron density will rise in a finite time rather than instantaneously. The time required for doubling the neutron density increases as the reproduction ratio decreases from above unity and approaches unity, and any desired rate of rise can be obtained.

The method of normal control preferred is to withdraw all safety rods from the reactor and then withdraw the control rod from the structure to a point where there is an exponential, and preferably slow rise in neutron density within the structure. When a desired neutron density has been reached, the control rod is then inserted into a deeper position in the neutronic reactor and to a point where the neutron density remains substantially constant. This density is then maintained to maintain a constant power output in the reactor. The maintenance of constant neutron density with the control rod would be relatively simple were it not for the fact that changes in temperature in the neuronic reactor change the reproduction ratio slightly, and in any chain reacting structure where there is any variation of atmospheric pressure in case of a structure exposed to the atmosphere, the reproduction ratio of the system will change slightly. It is desirable, therefore, that the control rod be so manipulated that a substantially constant neutron density within the system is maintained. Such a method of control may be accomplished by automatic connection of the control rods with an ionization chamber or similar device positioned within the reactor close to the active portion of the pile for measurement of neutron density.

While there are many means by which the normal control rod and the safety controls can be operated, it is believed that by the illustration and description of one simplified circuit, other and fully equivalent circuits will be made apparent to those skilled in the art.

Referring to Fig. 1, the control circuit "A" controls the operation of motor 24 that in turn controls the depth of the control rod 18 in the reactor. An ionization chamber 28 filled with boron fluoride is placed inside the concrete sidewall 10 adjacent to the periphery of the active structure 9. A central electrode 29 is provided within the chamber 28 and connected to movable slider 30 on a resistor 31. One side of a relay coil 32 is connected to one pole of battery 33, the other pole of which is connected to a metallic shield 34 surrounding electrode 29. Shield 34 and chamber 28 are both grounded.

Alpha rays given off by neutron reaction with the boron within chamber 28 cause ionization that is proportional to the neutron density. Thus, the current reaching resistor 31 is proportional to the neutron density in the ionization chamber. As has been explained, this density is proportional to the neutron density throughout the reactor. Relay coil 32 operates an armature 35 that is biased by spring 36 to contact one motor contact 37, and is urged by current in coil 32 to contact a second motor contact 38. Contacts 37 and 38 connect to the windings of reversible motor 24 in such a way that the motor lifts control rod 18 when armature 35 contacts motor contact 37 and lowers control rod 18 when armature 35 contacts motor contact 38.

Having described a circuit for controlling the position of a control rod, its operation is as follows, considering the safety rods withdrawn. Slider 30 on resistor 31, having previously been calibrated in terms of neutron density, is moved to the density position at which it is desired the reactor to operate, taking into account the difference in neutron density at the center of the active structure 9 and at the periphery thereof during operation. This difference is a constant ratio at various stabilized operative densities. The reactor, having at rest a neutron density much lower than the desired density at which relay coil 32 will receive enough current to operate armature 35, very little ionization takes place in ionization chamber 28 allowing armature 35 to be pulled against contact 37 by spring 36. Motor 24 is thus energized to withdraw the control rod 18 from the reactor to a point determined by a limit stop 39 where the reproduction ratio $r$ of the reactor is just sufficiently greater than unity to permit an exponential rise in neutron density within the reactor. The motor 24 will stall when the rod is at stop 39 and should be of a type permitting stalling for the required time. The reaction at this position of the control rod becomes self-sustaining and the neutron density rises. As the ionization in chamber 28 increases, more and more current passes through relay coil 32 until a value corresponding to the desired neutron density has been reached. Relay coil 32 then operates to cause armature 35 to connect with contact 38, thus reversing the motor 24 to drive the control rod into the reactor to a point where the neutron density starts to decay. The control rod 18 will thereafter hunt between a point above the balance position where the neutron density rises, and a point below the balance position where the neutron density decays, thus providing an average neutron density within the reactor as determined by the setting of slider 30 on resistor 31. As the mass of the reactor causes any temperature change to lag behind any neutron density change, the temperature of the reactor is maintained substantially constant. If desired, any of the well-known anti-hunting circuits may be utilized, as will be apparent to those skilled in the art.

Circuit (B) controls the safety rods 19. The rod 19 is withdrawn from the pile by closing switch 49 which connects motor 50 across the power supply. The safety rods 19, and also the control rod 18, fall by gravity into the reactor when armature 135 attracted by relay coil 132 opens the circuit between the power supply and the magnetic clutches 46 and 23. The relay armature is controlled by an ionization chamber circuit identical in all respects with the circuit previously described for operating the control rod, this safety circuit being given the same numbers plus 100. The circuit may be adjusted, for example, to attract relay armature 135 and open the circuit when the neutron density reaches 5 per cent over the normal operating density. A handswitch 150 can be used for the same purpose by the operating personnel.

Safety rod magnetic clutch 46 is connected in parallel with control rod magnetic clutch 23. Thus, upon any failure of power in the mains or the opening of switch 150 or contact 137, all of the rods will be relieved of their counterweights and will fall into the pile by gravity. Stops may be provided on the rods, and any suitable braking action used to reduce the impact shock on the reactor.

Valve 205 is released by a circuit "C" similar in operation to circuit "A" already described, the parts of said circuit "C" being numbered the same as identified parts of circuit "A" plus 200. If the neutron density should rise above a safe level, the ionization chamber 228, and its accompanying circuit operate in the manner described in reference to circuit A to energize relay coil 232, which attracts armature 235 opening the circuit between the power supply and solenoid 206, allowing spring 209 to open valve 205. Compressed air from tank 203 entering tank 201 forces the liquid 200 into tubes 40. The liquid 200 flows up tubes 40 until it reaches a float operated switch 210 which closes, connecting the power supply to solenoid 206 which in turn closes valve 205 shutting off the compressed air from tank 201. A pushbutton 250 may be operated by personnel to open the circuit to solenoid 206, if the ionization chamber circuit should fail.

The sliders 130 of circuit B and 230 of circuit C may be adjusted for any desired sequence of operation of safety rods and liquid. One approved method is to have both released at the same level of neutron density. In this mode of operation, the liquid will enter the reactor before the rods, because of the large pressure behind it causing it to move faster than the gravity operated rods. The liquid entering the reactor stops the rise of neutron density or at least slows it until the safety rods 19 enter the reactor stopping the chain reaction. The liquid 200 must be forced into the reactor quickly and in a large amount or the heat of the reactor may cause boiling and decomposition which would be very undesirable in that the volatile constituents of the boiling liquid would escape reducing the effectiveness of said liquid.

After the chain reaction has been stopped, the liquid 200 is drained from the tubes 40 by opening vent valve 208 allowing the liquid to re-enter the tank 201. Fresh liquid may then be placed in the tank 201, if the old liquid has been decomposed by heat or neutron bombardment. The tubes 40 may be flushed with water, if enough of the neutron absorber liquid 200 adheres to said tubes. However, the portion adhering may be so small that the chain reaction may be started again, the heat of the reaction volatilizing any residue liquid remaining.

There has thus been described an invention in which a flowable neutron absorber is used in conjunction with absorbing rods to safely control a neutron reactor. While the theories set forth herein are based on the best presently known experimental evidence, it is not desired to be bound thereby, as additional evidence later discovered may modify the theory disclosed. Any such modification of theory, however, will in no way affect the results to be obtained in the practice of our invention.

What is claimed is:

In a neutronic reactor having an active portion adapted to maintain a self-sustaining neutronic reaction, the improved construction comprising a tube extending into the active portion, a container exterior to the active portion, a body of a water solution having a volatile ammonium compound within the container, a rod of boron steel aligned with the tube, fluid-flow means to eject the solution from the container into the tube, and actuating means coupled to the rod to move the rod into the tube.

References Cited in the file of this patent

UNITED STATES PATENTS

| | | |
|---|---|---|
| 1,389,049 | Jacobs | Aug. 30, 1921 |
| 1,407,036 | Icenhour | Feb. 21, 1922 |
| 2,403,170 | Chapman | July 2, 1946 |

FOREIGN PATENTS

| | | |
|---|---|---|
| 114,150 | Australia | May 2, 1940 |
| 114,151 | Australia | May 3, 1940 |
| 233,011 | Switzerland | Oct. 2, 1940 |
| 861,390 | France | Oct. 28, 1940 |

OTHER REFERENCES

Amaldi et al.: Proc. Roy. Soc. of London, Series A, No. 868, vol. 149, pages 526, 554, 555 (Apr. 1, 1945).

Interaction of Neutrons with Matter-Dunning, etc., Physical Review, vol. 48, pages 265–282.

A General Account of the Development of Methods of Using Atomic Energy, by H. D. Smyth, pub. August 1945, pages 177–180, by Supt. of Doc., Washington, D. C.

Nucleonics (June 1953), page 39.

Introduction to Nuclear Engineering, by Stephenson, pub. by McGraw-Hill Book Co., N. Y. (1954), pages 277–280, 294.